United States Patent
Senta et al.

(10) Patent No.: US 7,636,310 B2
(45) Date of Patent: Dec. 22, 2009

(54) COMMUNICATION CONTROL SYSTEM AND COMMUNICATION CONTROL METHOD

(75) Inventors: Yosuke Senta, Kawasaki (JP); Shinichi Sazawa, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 11/287,318

(22) Filed: Nov. 28, 2005

(65) Prior Publication Data
US 2006/0203855 A1    Sep. 14, 2006

(30) Foreign Application Priority Data
Mar. 14, 2005   (JP) ............................. 2005-071987

(51) Int. Cl.
   *H04L 12/26* (2006.01)
(52) U.S. Cl. ...................................... 370/235; 370/389
(58) Field of Classification Search ......... 370/229–231, 370/232, 233–235, 238, 389, 252, 253, 235.1, 370/236
See application file for complete search history.

(56) References Cited

U.S. PATENT DOCUMENTS

| 2001/0015956 | A1* | 8/2001 | Ono ............................ 370/229 |
| 2002/0194361 | A1 | 12/2002 | Itoh et al. |
| 2004/0001691 | A1 | 1/2004 | Li et al. |
| 2005/0286416 | A1* | 12/2005 | Shimonishi et al. ......... 370/229 |

FOREIGN PATENT DOCUMENTS

| JP | 61-224754 | 10/1986 |
| JP | 11-163936 | 6/1999 |
| JP | 11-308271 | 11/1999 |
| JP | 2000-324198 | 11/2000 |
| JP | 2001-111618 | 4/2001 |
| JP | 2001-144802 | 5/2001 |
| JP | 3662907 | 4/2002 |
| JP | 2004-88746 | 3/2004 |
| JP | 2004-266756 | 9/2004 |
| WO | 02/25878 | 3/2002 |
| WO | 2004/080077 | 9/2004 |

OTHER PUBLICATIONS

U.S. Appl. No. 11/043,122, filed Jan. 27, 2005, Hassan.
Office Action mailed on Sep. 16, 2008 and issued in corresponding Japanese Patent Application No. 2005-071987.

* cited by examiner

*Primary Examiner*—Brenda Pham
(74) *Attorney, Agent, or Firm*—Fujitsu Patent Center

(57) ABSTRACT

In a communication control system a reception-side terminal sends back transmission time information included in a transmission packet as an acknowledgment to a transmission-side terminal. The transmission-side terminal determines whether a response time, obtained from the transmission time information, is shorter than a threshold. When the response time is shorter, the transmission-side terminal controls so as to transmit to the reception-side terminal a larger number of packets than the number of packets upon transmission of the transmission packet, or to transmit the same number of packets as the number of packets upon transmission of the transmission packet.

10 Claims, 6 Drawing Sheets

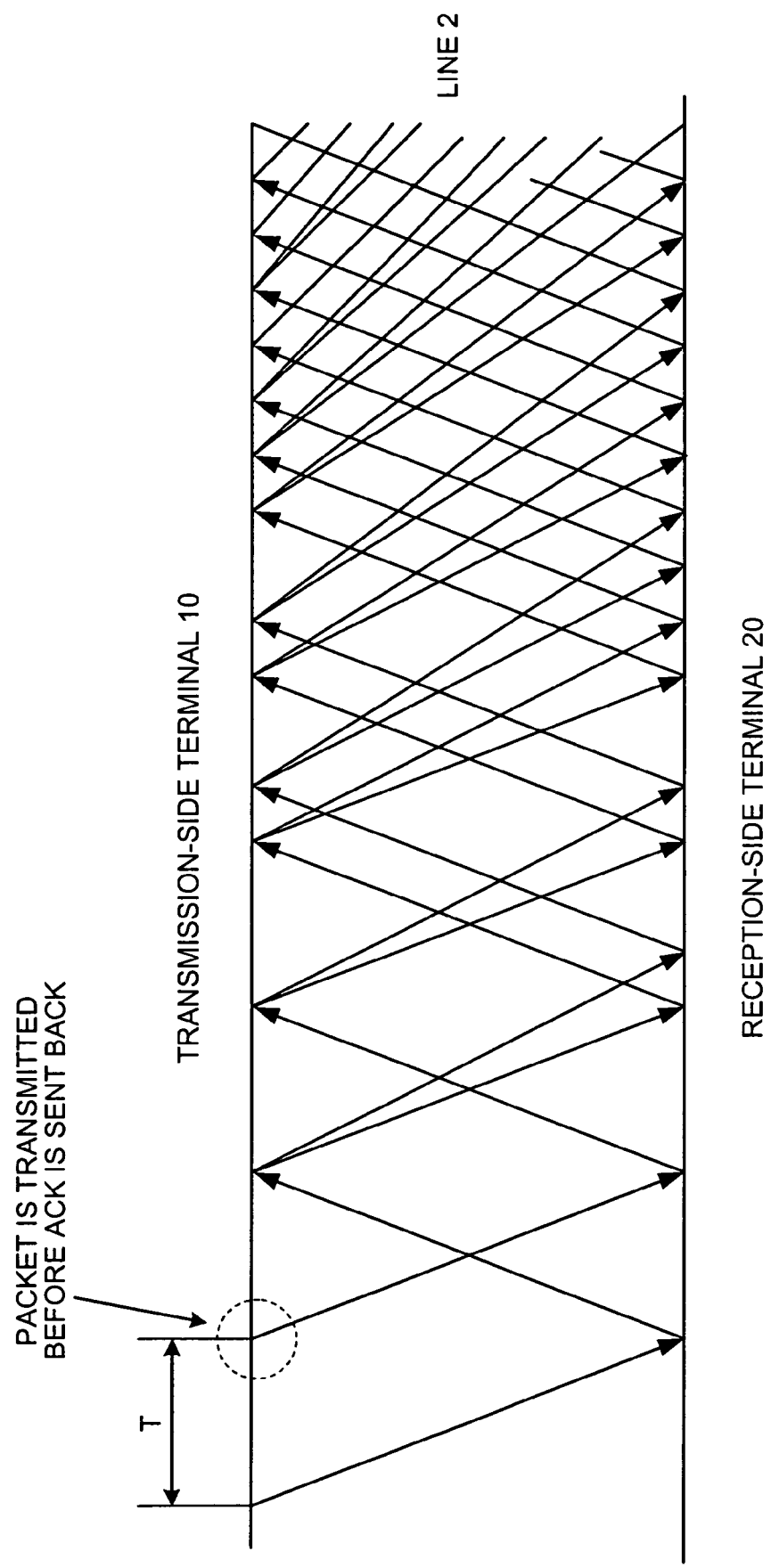

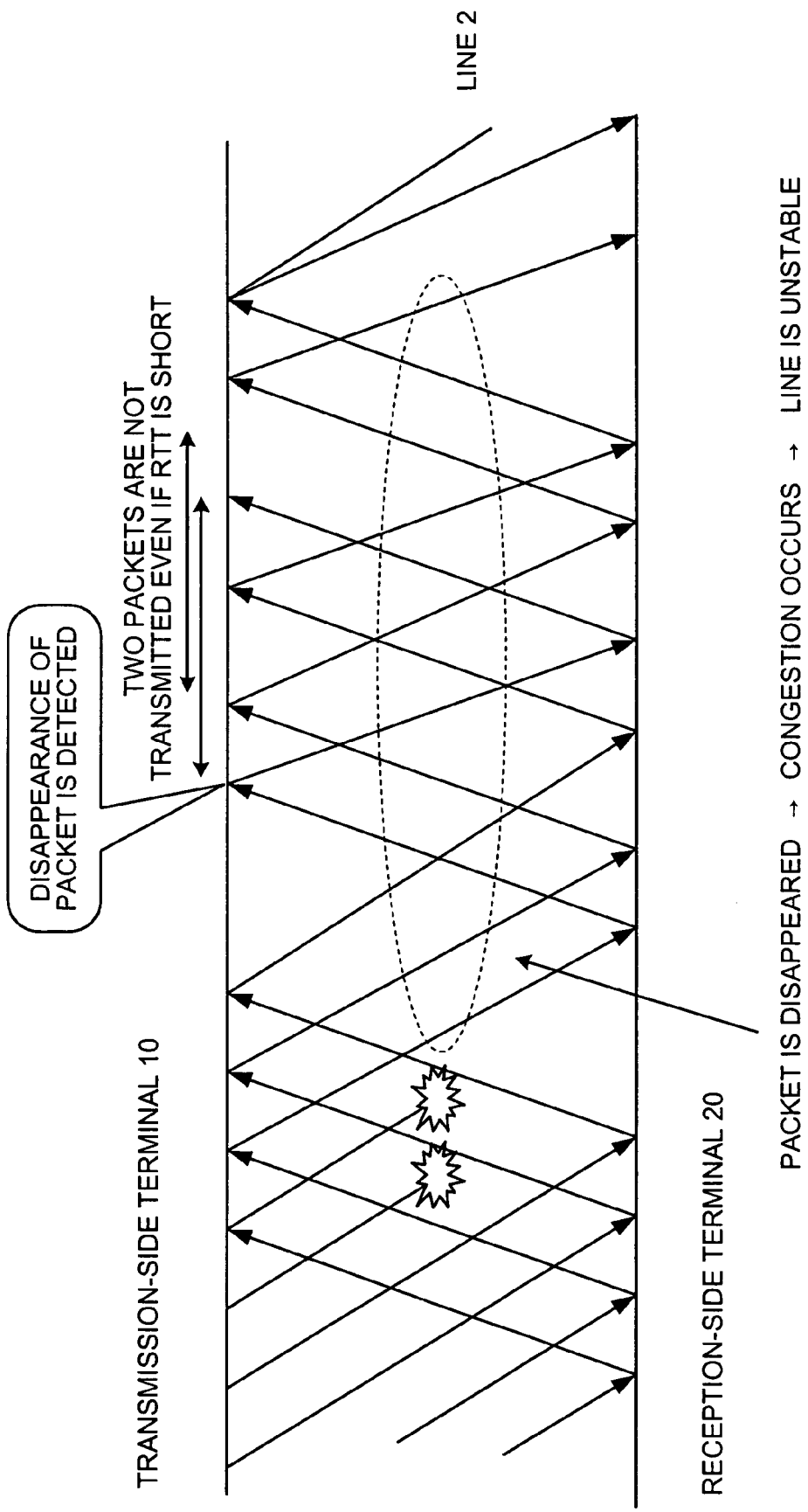

COMMUNICATION CONTROL SYSTEM AND COMMUNICATION CONTROL METHOD

BACKGROUND OF THE INVENTION

1. Field of the Invention

The present invention relates to a technology for performing digital communications with packets.

2. Description of the Related Art

The demand for the amounts of data that is passed through a network is increasing more and more with development of a computer network, but performance of the network cannot be made effective use of, according to the nature of a Transmission Control Protocol (TCP) which is a standard protocol for the network.

For this reason, Random Parity Stream (RPS) codes have been proposed. A User Datagram Protocol (UDP) has an advantage being a high transmission rate and a disadvantage being low reliability. In order to cover the disadvantage when transmission data is sent by a UDP packet, the RPS codes are used so that the low reliability is covered with Forward Error Correction (FEC).

In UDP packet communication, a technique of sending UDP packets at intervals according to the size of a line is used to prevent line congestion. In this technique, however, the UDP packets are uniformly transmitted at a transmission interval set for each line. Therefore, changes in congestion situations, for example, the identical line is used by another communication, cannot be detected, and hence, data cannot be transmitted at an appropriate speed for each line.

More specifically, if another communication is the UDP communication, then the line congestion further increases because the communication is not controlled by the two so as to avoid congestion. On the other hand, if another communication is TCP-based, then the congestion situations are obtained only by TCP and the congestion control is performed so that the transmission rate is reduced. This restricts data communication by the TCP packets.

One approach to realize high speed communication is to include a congestion control in the UDP communication thereby having a high affinity with the TCP. Such a flow control device is disclosed in, for example, Japanese Patent Application Laid-Open (JP-A) No. H11-163936. This flow control device decides a packet transmission speed based on Round Trip Time (RTT) (a difference between an acknowledgement arrival time and a packet transmission time) and information whether packet abandonment is needed, by using a algorism of an optimal packet transmission speed.

More specifically, when the acknowledgement (ACK) arrives from a data reception-side terminal, the flow control device obtains the RTT and the information, determines a feature amount indicating a state of a packet network based on the RTT and the information obtained, and identifies a parameter indicating a relation between the feature amount and the packet transmission speed, to decide an optimal packet transmission speed based on the parameter identified.

In the conventional technology, however, a calculation equation (e.g., calculation algorism for an optimal packet transmission speed) used to perform the congestion control is complicated, or packets need to be periodically transmitted at an extremely short period. Therefore, a heavy load can be exerted on a computer with non-real-time operating system (OS).

That is, in a network communication, if data exceeding the capacity (speed) of a communication channel passes through a channel, an excess of the data (packet) can be lost. Therefore, in order not to cause the packet to be lost, a data transmission-side terminal needs to transmit data at frequencies within the capacity of the communication channel. However, in order to periodically transmit a packet at an extremely short period based on the non-real-time OS, there is only one method of using a loop instruction or issuing an interrupt instruction at an accurate interval using specific hardware.

To explain this more specifically, the overview of time management for non-real-time multitask OS and some problems with this OS are explained. Since it is generally considered that calculation capacity of the OS is a kind of resources, the calculation capacity needs to be shared by a plurality of tasks (processes). Therefore, if it is desired that a process is caused to be performed at a fixed interval, such a process as follows should not be performed because the load is concentrated on this task. That is, the process is such that the time is monitored by the loop instruction and the process is executed when a predetermined interval passes.

In a task program, the following interrupt instructions are desired to be used instead of the loop instruction. The interrupt instructions are such as "Suspend for a fixed time, return the calculation capacity to the system" (Sleep) and "Issue an interrupt when a predetermined time passes" (alarm, WM_TIMER). In the non-real-time OS, a difference between times that can be set by such instructions (Sleep) (alarm, WM_TIMER) is about 20 to 50 milliseconds, which is not accurate at all.

Consequently, even if the packet is to be transmitted at a speed suitable for a network in an application layer, only the loop instruction has to be used because the difference with respect to the set time is large when the interrupt instruction is used. Thus, the calculation capacity is inevitably occupied by implementation of the congestion control. Furthermore, another method of issuing an interrupt instruction at an accurate interval using specific hardware can be considered, but the specific hardware is newly required in this case.

SUMMARY OF THE INVENTION

It is an object of the present invention to at least solve the problems in the conventional technology.

According to an aspect of the present invention, a communication control system includes a transmitting device that transmits a transmission packet to a receiving device. The receiving device transmits an acknowledgement to a transmitting device upon receiving the transmission packet. The receiving device includes a response processor that sends transmission time information included in the transmission packet to the transmitting device as the acknowledgment, and the transmitting device includes a within-threshold determining unit that determines whether a response time calculated based on the transmission time information received from the receiving device is shorter than a threshold, and a transmission controller that controls, when the response time is shorter than the threshold, so as to transmit to the receiving device either one of a larger number of packets than the number of packets upon transmission of the transmission packet and the same number of packets as the number of packets upon transmission of the transmission packet.

According to another aspect of the present invention, a method of controlling packet communications between a transmitting device and a receiving device, wherein transmitting device transmits a packet to a receiving device and the receiving device transmits an acknowledgement to a transmitting device upon receiving the transmission packet, includes the receiving device sending transmission time information included in the transmission packet to the transmitting device as the acknowledgment, and the transmitting device determining whether a response time calculated based on the transmission time information received from the receiving device is shorter than a threshold, and transmitting to the receiving device, when the response time is shorter than the threshold, either one of a larger number of packets than the number of packets upon transmission of the transmission packet and the same number of packets as the number of packets upon transmission of the transmission packet.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram of another example of the packet transaction; and

FIG. 6 is a diagram of another example of the packet transaction.

DETAILED DESCRIPTION OF THE PREFERRED EMBODIMENTS

Exemplary embodiments of the case where a transmitting device and a receiving device in the communication control system are used for an information processor are explained in detail below with reference to the accompanying drawings. The overview and features of the communication control system according to the present invention are explained first, and then a communication control system according to a first embodiment is explained, and lastly, various modifications (second embodiment) as another embodiment are explained. In the first embodiment, an information processor on the data transmission side is described as "transmission-side terminal", and an information processor on the data reception side is described as "reception-side terminal".

Figure 1:
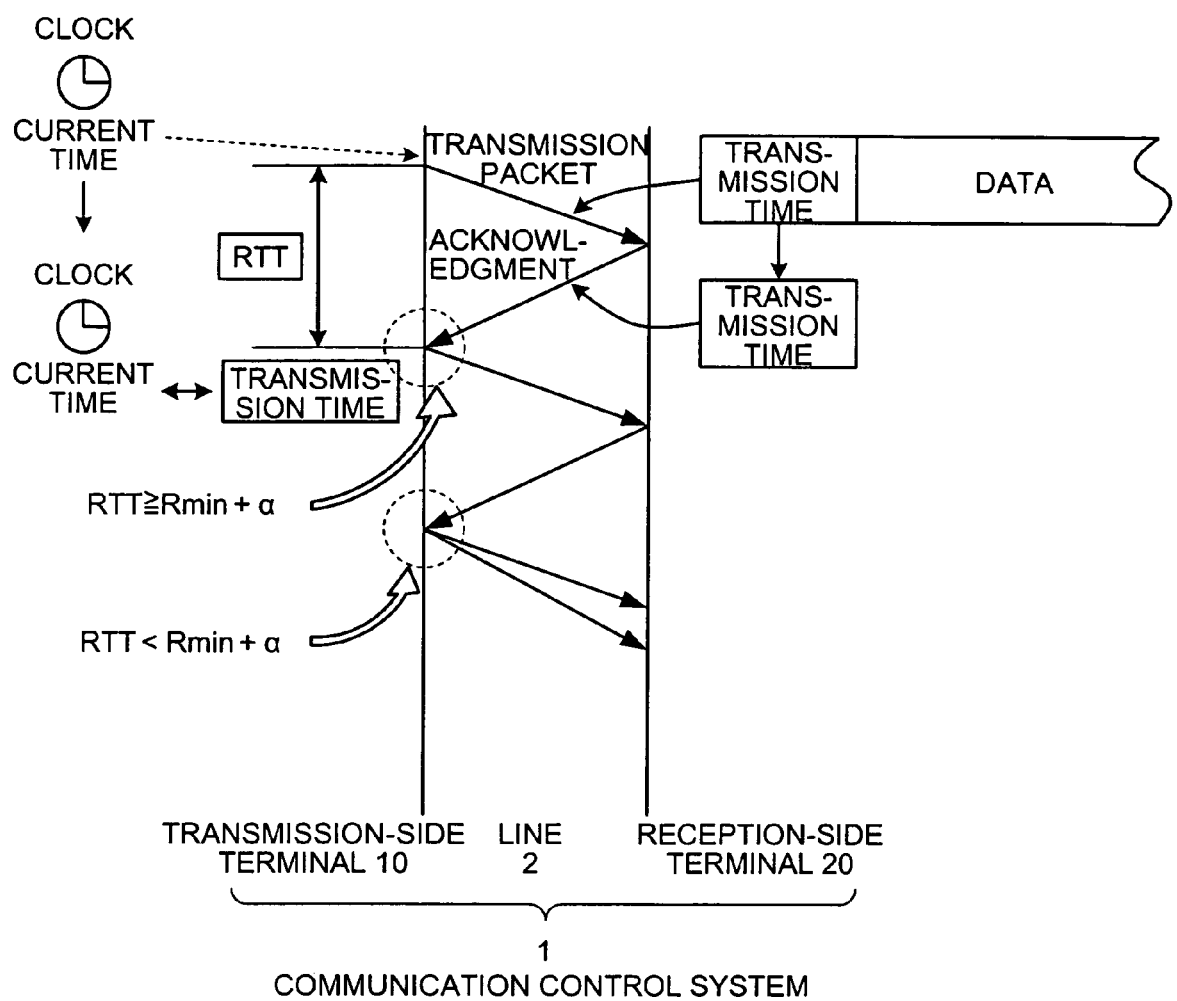
FIG. 1 is a conceptual diagram of an overview and features of an exemplary communication control system according to the present invention.

FIG. 1 is a conceptual diagram of the overview and features of an exemplary communication control system according to the present invention. A communication control system 1 controls UDP packet communication between a transmission-side terminal 10 and a reception-side terminal 20, and includes the transmission-side terminal 10 that transmits a packet to the reception-side terminal 20, and the reception-side terminal 20 that sends back an acknowledgement of the transmission packet which is transmitted by the transmission-side terminal 10, to the transmission-side terminal 10.

The reception-side terminal 20 sends back transmission time information, as an acknowledgment, included in the transmission packet which is transmitted, the transmission-side terminal 10 determines whether the response time obtained from the transmission time information sent-back as the acknowledgment is shorter than a threshold. If it is determined that the response time is shorter than the threshold, the transmission-side terminal 10 controls so as to transmit a larger number of packets than the number of packets upon transmission of the transmission packet, or to transmit the same number of packets as the number of packets upon transmission of the transmission packet, to the reception-side terminal 20. The congestion control can be performed by implementing such a series of processes as explained above while reducing the load to the computer.

In the communication control system 1, as shown in FIG. 1, when a transmission packet is transmitted by the transmission-side terminal 10, the reception-side terminal 20 embeds the transmission time information included in the transmission packet, in the ACK, and sends it back to the transmission-side terminal 10. The reason that the transmission time information included in the transmission packet is included in the ACK as it is and is sent back to the transmission-side terminal 10 is because the transmission-side terminal 10 can obtain an RTT.

On the other hand, the transmission-side terminal 10 calculates a round trip time "RTT" based on the transmission time included in the ACK packet sent-back from the reception-side terminal 20 and the ACK arrival time, and determines whether the RTT calculated is shorter than a minimum value (Rmin) of the RTT until now, or shorter than a value (Rmin+$\alpha$) obtained by adding a predetermined value (for example, coefficient $\alpha$ allowing for a queuing time on a line 2) to the minimum value. By determining whether it is shorter than the threshold in the above manner, it is determined whether the load to a router is light enough. The router is provided just before a lowest point (bottle neck) of the line capacity of the communication channel.

If it is determined that the RTT of the transmission packet is shorter than the threshold, the transmission-side terminal 10 determines that the capacity at the bottle neck of the communication channel is below its allowable capacity, and transmits another two packets to the reception-side terminal 20. If it is determined that the RTT of the packet is the threshold or longer, then the transmission-side terminal 10 determines that the bottle neck of the communication channel is in a congestion state, and transmits one packet to the reception-side terminal 20.

The control is performed in the following manner. That is, it is determined whether the response time is shorter than the threshold. If the response time is shorter than the threshold, and if the number of packets upon transmission of the transmission packet is one, then two packets are transmitted, and if the number of packets upon transmission of the transmission packet is two, then two packets are also transmitted. This control allows congestion control in which the amount of data according to network situations is dynamically transmitted, and also allows employment of a simple algorism as the calculation algorism of the optimal transmission rate for the congestion control of the UDP communication.

Furthermore, the transmission-side terminal 10 employs an existing technology called "self clocking" such that the calculation capacity is regained from the system when receiving an ACK packet from the reception-side terminal 20, and another packet is transmitted. By including the congestion control in "self clocking", an event driven system (i.e. a system of interrupting a process (a process of transmitting a packet) according to an event (i.e. ACK)) can be employed for the congestion control of the UDP communication.

Therefore, referring to the example of the conventional technology, the congestion control of UDP communication is not performed in such a manner that the heavy load is applied to the computer by using a complicated calculation equation to include the congestion control or by using periodical transmission control of packets (e.g., packet transmission control by the loop instruction). But the congestion control of the UDP communication is performed by using a simple algorism as the calculation algorism of the optimal transmission rate for the event driven system. This allows the congestion control, as explained for the main characteristic, while the load to the computer is reduced.

Figure 2:
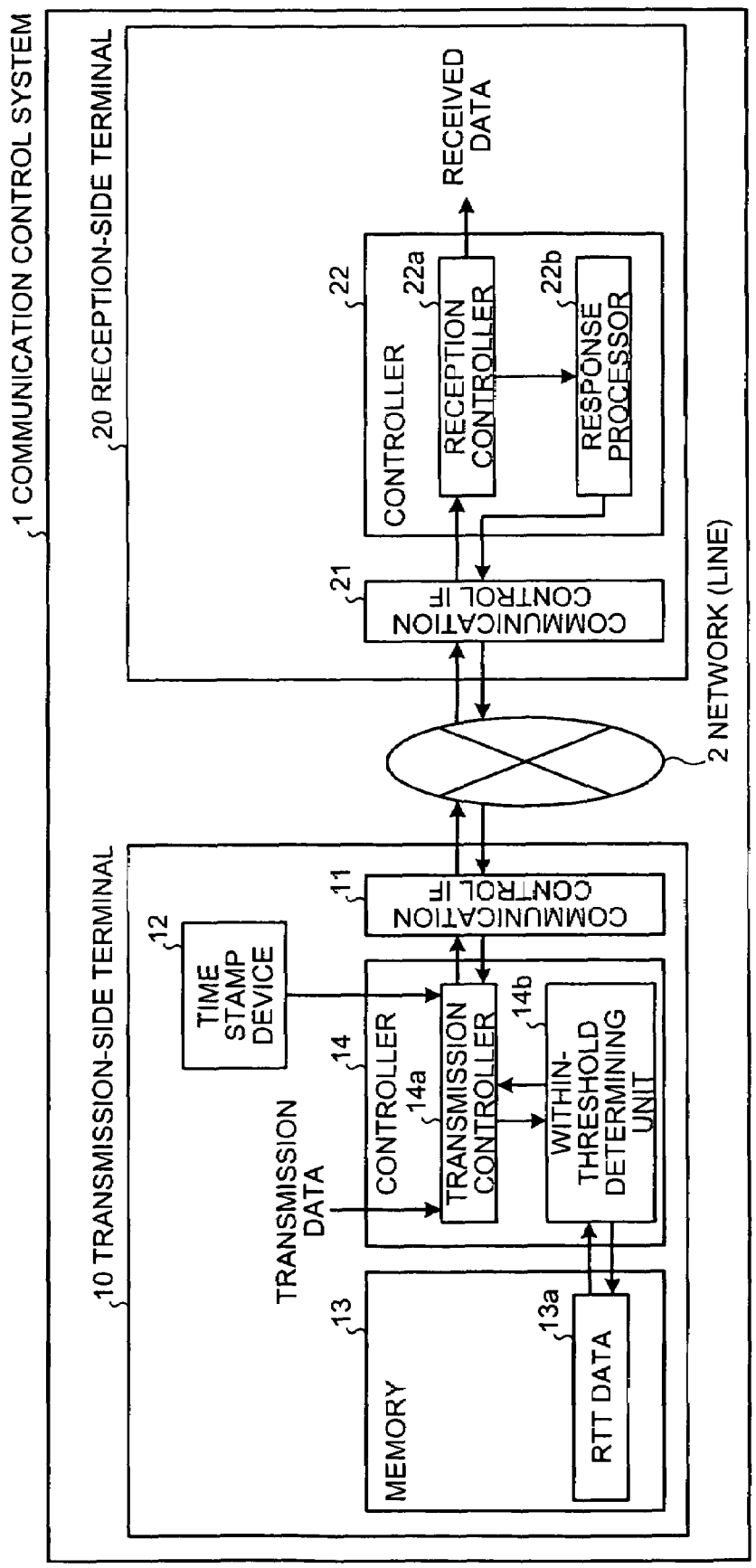
FIG. 2 is a block diagram of a communication control system according to a first embodiment of the present invention.
Figure 3:
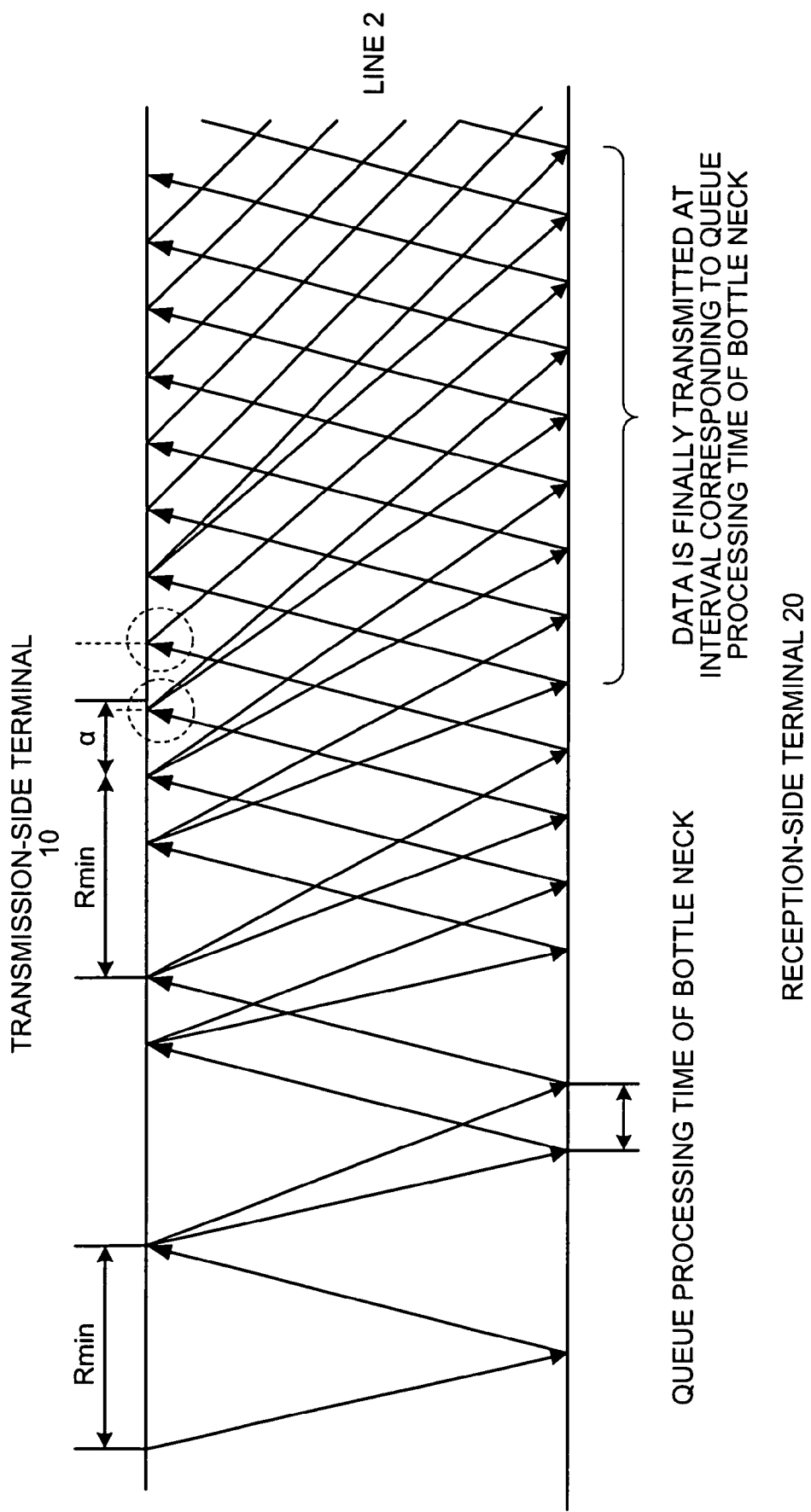
FIG. 3 is a schematic for explaining one example of packet transaction according to the first embodiment.

FIG. 2 is a block diagram of the configuration of communication control system according to the first embodiment. The communication control system 1 includes the transmission-side terminal 10 that transmits a transmission packet to the reception-side terminal 20, and the reception-side terminal 20 that sends back an ACK of the transmission packet which is transmitted by the transmission-side terminal 10, to the transmission-side terminal 10.

Of the two, the reception-side terminal 20 is an information processor on the side where a transmission packet which is transmitted by the transmission-side terminal 10 is received, and includes a communication control interface (IF) 21 that controls communication between the reception-side terminal 20 and a network (line) 2, and a controller 22.

The controller 22 is a processor that controls the whole of the reception-side terminal 20, and is a controller that serves as a unit that exchanges various data between functional units. The controller 22, being a processor related to the present invention, includes a reception controller 22a which forms the transmission packet transmitted by the transmission-side terminal 10 as received data, and a response processor 22b.

The response processor 22b is a processor that sends back transmission time information, as an ACK packet, included in a transmission packet when it is confirmed that the reception controller 22a successfully receives the transmission packet.

The transmission time information included in the transmission packet is included in the ACK packet, and is sent back as it is to the transmission-side terminal 10. Therefore, as shown in FIG. 1, the transmission-side terminal 10 can obtain an RTT from a difference between the transmission time information and ACK reception time.

On the other hand, the transmission-side terminal 10 is an information processor on the side where transmission data is transmitted to the reception-side terminal 20. The transmission-side terminal 10 includes a communication control IF 11 that controls communications between the transmission-side terminal 10 and the network 2, a time stump device 12 that supplies time information acquired from a time generation server, a memory 13, and a controller 14.

The memory 13 is a storage unit (memory unit) that stores data and programs required for the various processes used by the controller 14. The storage unit also stores a minimum value (Rmin) of RTT until now or a value (Rmin+α) obtained by adding a predetermined value (for example, coefficient α allowing for a queuing time on the line 2) to the minimum value, each value being stored as RTT data 13a, for each reception-side terminal as a destination or for each channel of the line 2. In the first embodiment, an extremely large value, being an initial value of the Rmin, is previously stored before a start packet is transmitted.

The controller 14 is a processor that includes an internal memory for storing a control program such as the non-real-time OS, programs for specifying various process procedures, and required data, and that executes the processes by the programs. The controller 14 includes a transmission controller 14a and a within-threshold determining unit 14b, which are components in particular closely related to the present invention.

The transmission controller 14a is a processor that controls so as to divide transmission data into packets and transmit the packets to the reception-side terminal 20. More specifically, the transmission controller 14a transmits a packet in which transmission time information acquired from the time stump device 12 is embedded, to the reception-side terminal 20.

The within-threshold determining unit 14b is a processor that determines whether the response time obtained from the transmission time information sent-back by the response processor 22b is shorter than the threshold. More specifically, the within-threshold determining unit 14b compares the round trip time "RTT" of the transmission packet transmitted with the RTT data 13a stored in the memory 13, namely, with the minimum value (Rmin) of the RTT until now or the value (Rmin+α) obtained by adding the predetermined value (for example, coefficient α allowing for a queuing time on the line 2) to the minimum value, to determine the relation of the two values.

The transmission controller 14a controls data amounts to be transmitted to the reception-side terminal 20 according to the result of determination by the within-threshold determining unit 14b. More specifically, if it is determined that the response time is shorter than the threshold, the transmission controller 14a determines that the capacity at the bottle neck of the channel of the line 2 is below its allowable capacity, and transmits another two packets to the reception-side terminal 20. If it is determined that the RTT of the transmission packet is the threshold or longer, the transmission controller 14a determines that the bottle neck of the channel of the line 2 is in its congestion state, and transmits one packet to the reception-side terminal 20.

In the above manner, by controlling so as to transmit two packets if it is determined that the response time is shorter than the threshold, and to transmit one packet if it is determined that the response time is the threshold or longer, transmission data can be transmitted at an interval corresponding to a queue processing time of the bottle neck. Thus, the congestion control can be performed so that data by amounts according to network situations is dynamically transmitted.

The transmission packet or the ACK packet may be disappeared on the way to be transmitted, and if all the packets during transmission are disappeared, then another packet cannot be transmitted, which results in "hang-up" of the data transmission process.

Therefore, when the ACK is not sent back by the response processor 22b within a predetermined time, the transmission controller 14a controls so as to transmit a packet without receiving the ACK. For example, if the ACK packet does not arrive from the response processor 22b within a fixed time (e.g., β), the transmission controller 14a transmits another one packet.

Figure 4:
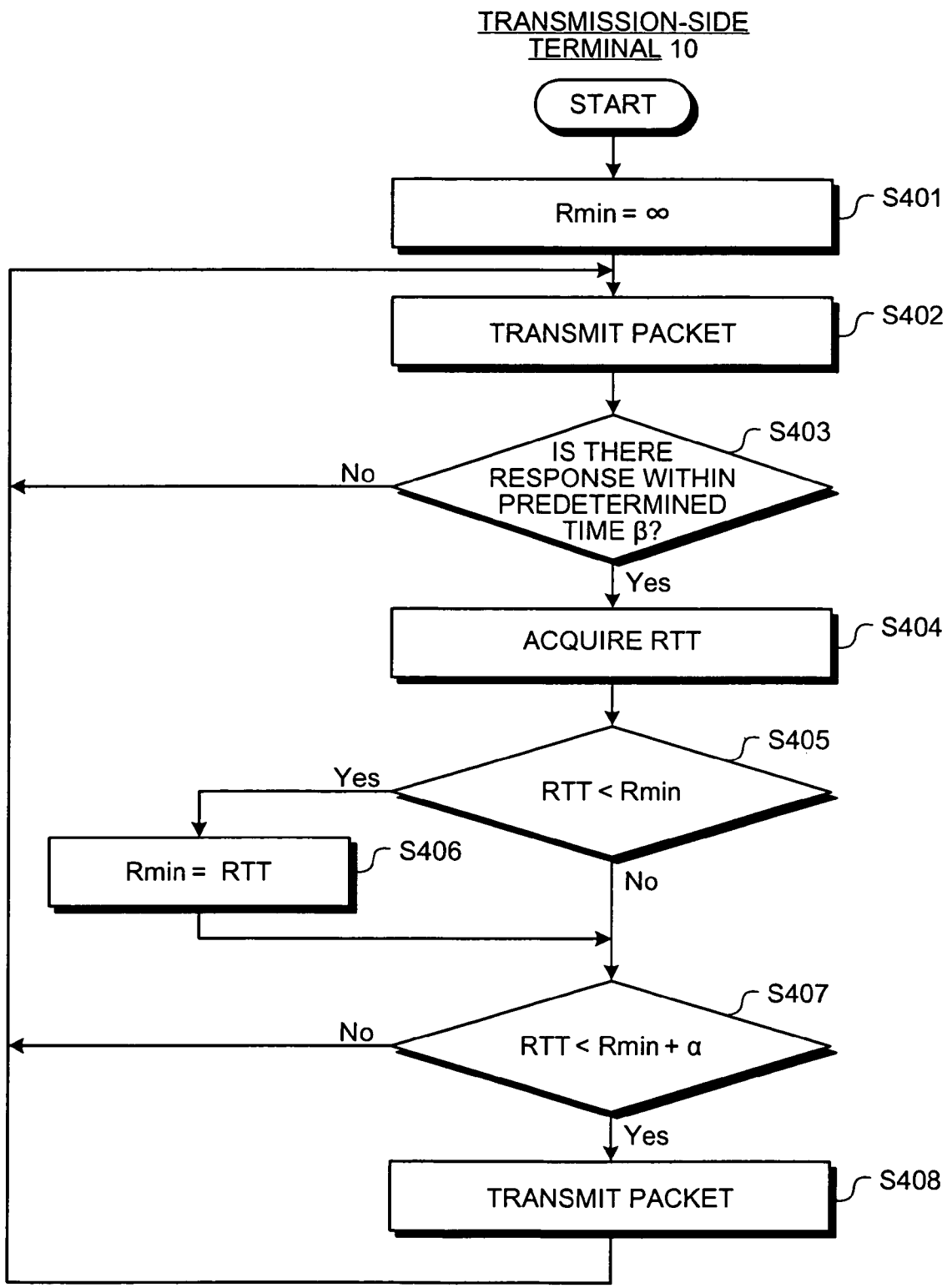
FIG. 4 is a flowchart of a data transmission process according to the first embodiment.

Various process procedures in the communication control system according to the first embodiment are explained below. FIG. 4 is a flowchart of a procedure of data transmission process according to the first embodiment. This process is started when a data transmission request is accepted. The data transmission request may be a request from a user or a request issued from an internal device of the terminal device or an external device.

As shown in FIG. 4, the transmission controller 14a sets an extremely larger value, being an RTT minimum value "Rmin" of the RTT data 13a, in the memory 13 (step S401), and transmits a start packet out of packets obtained by dividing the transmission data, to the reception-side terminal 20 (step S402). At this time, when confirming that the transmission packet is successfully received, the reception-side terminal 20 sends back the transmission time information, as the ACK packet, included in the transmission packet, to the transmission-side terminal 10.

If the ACK packet is not received from the response processor 22b within a predetermined time "β" (step S403, No), the transmission controller 14a transmits another one packet without receiving the ACK.

On the other hand, if the ACK packet is received from the response processor 22b within the predetermined time "β" (step S403, Yes), the transmission controller 14a calculates an RTT of the transmission packet based on a difference between a transmission time included in the ACK packet and a reception time of the ACK packet (step S404).

The within-threshold determining unit 14b compares the RTT of the transmission packet with the RTT data 13a stored in the memory 13, i.e. with the minimum value (Rmin) of the RTT until now, to determine the relation of the two values (step S405). If it is determined that "RTT<Rmin" (step S405, Yes), the within-threshold determining unit 14b updates the RTT minimum value "Rmin" in the RTT data 13a (step S406).

Furthermore, the within-threshold determining unit 14b compares the RTT of the transmission packet with a value (Rmin+α) obtained by adding a predetermined value (for example, coefficient α allowing for a queuing time on the line 2) to the minimum value (Rmin) of the RTT until now, to determine the relation of the two values (step S407).

If it is determined by the within-threshold determining unit 14b that "RTT<Rmin+α" (step S407, Yes), the transmission controller 14a transmits another two packets to the reception-side terminal 20 (step S408 and step S402).

If it is determined that "RTT≧Rmin+α" (step S407, No), the transmission controller 14a transmits one packet to the reception-side terminal 20 (step S402).

Referring to this "data transmission process", the processes at step S402 to step S408 are recursively performed until all the packets of the transmission data are transmitted to the reception-side terminal 20.

In the communication control system 1 according to the first embodiment, the congestion control of the UDP communication can be performed using the simple algorism as a calculation algorism of an optimal transmission rate for the event driven system, thus, performing the congestion control while reducing the load to the computer. Moreover, since the simple algorism that uses only calculations of comparison of sizes and branch is used, the congestion control can be adapted to any poor Central Processing Unit (CPU) such as an integration system.

In the communication control system according to the first embodiment, even if the transmission packet or the ACK packet is lost during its transmission, the freeze of the data transmission process can be prevented.

Although the first embodiment of the present invention is explained so far, the present invention may be implemented by examples included in a second embodiment of the present invention, other than the first embodiment, if they are within a scope of technological ideas described in the claims explained later. Various examples as shown below are explained in the following respective divisions: (1) Configuration, (2) Transmission control of packets. (3) Within-threshold determination, and (4) Other.

(1) Configuration

In the communication control system according to the first embodiment, the example where the transmission-side terminal 10 includes the transmission controller 14a and the within-threshold determining unit 14b and the reception-side terminal 20 includes the response processor 22b is explained. However, the present invention is not limited by the example, but the transmission-side terminal 10 may further include a function of the receiving device according to the present invention (function of the response processor 22b), or the reception-side terminal 20 may further include a function of the transmitting device according to the present invention (functions of the transmission controller 14a and the within-threshold determining unit 14b).

In the first embodiment, the example where the network 2 in the communication control system 1 is wired is explained, but the present invention is not limited by the example. The present invention can be used for wireless communication as well.

(2) Transmission Control of Packets

In the first embodiment, the example, where the packet to be transmitted to the reception-side terminal 20 is one when the start packet is not received or the ACK is not received within the predetermined time, is explained, but in the present invention, when the ACK is not sent back within the predetermined time by the response processor 22b or when the start packet is transmitted, the control may be performed so as to transmit a plurality of packets to the reception-side terminal 20.

For example, even when the ACK is not sent back within the predetermined time by the response processor 22b or when the start packet is to be transmitted, a plurality of packets such as two and three may be transmitted. Alternatively, as shown in FIG. 5, packets may be transmitted at a fixed interval T before an initial ACK is sent back. It is noted that the load to the computer during this time is increased but this is not particularly a problem for the whole system because the RTT is generally about 500 milliseconds at longest.

When the ACK is not sent back within the predetermined time or the start packet is transmitted, the control is performed so as to transmit a plurality of packets to reception-side terminal 20. It thereby becomes possible to shift quickly to an optimal transmission rate from the time at which the packet is started to be transmitted or from the time at which the packet is lost.

(3) Within-Threshold Determination

The present invention may use the result of an averaging process for the process of within-threshold determination, instead of the response time obtained from the transmission time information sent-back by the response processor 22b. More specifically, the averaging process is performed so that it is more heavily weighted toward a response time of a previous transmission packet which is transmitted before the transmission packet is transmitted, as compared with the response time of the transmission packet.

That is, in the communication control system 1 according to the first embodiment, when the RTT largely fluctuates depending on each transmission packet, the number of packets transmitted by the transmission controller 14a also changes largely, which leads to occurrence of a factor that causes instability of a line. Therefore, the RTT is extracted from the ACK sent-back from the reception-side terminal 20, and a value of "Rave" obtained as a result of using an appropriate filter is compared with the threshold; Rmin+α, to determine whether the response time is within the threshold.

More specifically, in order to stabilize the transmission rate of a transmission packet which is transmitted by the transmission controller 14a, the result of an averaging process is employed as an input value. The averaging process is performed so that it is more heavily weighted toward "Rave" of a previous transmission packet which is transmitted before the transmission packet is transmitted. For example, the RTT of the transmission packet is substituted in an equation of an weighted average of "$Rave_n=0.9\times Rave_{n-1}+0.1\times RTT$" to calculate "Rave", and the "Rave" calculated is compared with the threshold "$Rmin+\alpha$". The equation of weighted average is set so that the "Rave" of a previous transmission packet which is transmitted before the transmission packet is transmitted is weighted more heavily.

In the above manner, the result of the averaging process is used for the process of within-threshold determination. The averaging process is performed so that it is more heavily weighted toward the response time of the previous transmission packet transmitted before the transmission packet is transmitted as compared with the response time of the transmission packet, instead of the response time obtained from the transmission time information sent-back by the response processor 22b. An abrupt change in the transmission rate of packets can thereby be minimized, thus preventing unstable state of communications over a network.

In the first embodiment, the example where when the ACK packet is sent back by the reception-side terminal 20, RTT:R (or Rave) is compared with the threshold, thereby deciding whether one packet should be transmitted or two packets should be transmitted is explained. However, the present invention is not limited by this example, and hence, the threshold is set in multiple levels, and the number of packets to be transmitted may be decided by being divided into respective numbers such as 0, 3, 4, . . . n pieces according to each level of the threshold.

(4) Other

In the first embodiment, the example where the response processor 22b sends back an ACK for each transmission packet is explained, but the present invention is not limited by this example. Therefore, an ACK of a transmission packet may be sent back at a predetermined frequency.

For example, the communication control system 1 is configured so as to send back an ACK in each three-time, five-time, . . . n-time transmission of the transmission packet. This allows reduction in use of the network caused by sending back of ACKs to the transmission-side device, thus efficiently performing network communications.

In the present invention, a specific serial number is assigned to a transmission packet and the serial number together with transmission time information is embedded in the ACK, thereby detecting whether the packet is lost. Furthermore, the transmission-side terminal 10 manages the transmission time information in each transmission packet in a list form, and thereby enables to detect whether the packet is lost in the same manner as a method of assigning an identifier to a transmission packet.

When disappearance of the transmission packet is detected by using this method, as shown in FIG. 6, even if it is determined that the response time is shorter than the threshold, the congestion control can be more accurately performed by controlling so as to transmit a smaller number of packets than the number of packets upon transmission of a single packet or of the transmission packet, to the reception-side terminal 20.

Among the processes explained in the first embodiment, the whole or a part of the processes explained as those automatically performed can be manually performed, or the whole or a part of the processes explained as those manually performed can also be automatically performed using a known method. Other than these, information including process procedures shown in the document or the drawings, the control sequence, the specific names, the various types of data, and the parameter can be arbitrarily changed unless otherwise specified.

The shown components of the respective devices are functionally conceptual, and hence, they are not necessarily required to be physically configured as shown in the figures. In other words, specific forms of distribution and integration of the devices are not limited to these shown in the figures, and the whole or a part of the devices can be distributed and integrated functionally or physically in an arbitrary unit according to various types of loads and their use situations. Furthermore, the whole or a part of the processing functions performed in the respective devices can be realized by the CPU and the programs that are analyzed and executed by the CPU, or can be realized as hardware based on wired logic.

According to one aspect, a congestion control of the UDP communication can be realized by using a simple algorithm as a calculation algorism for the optimal transmission rate for the event driven system, thus performing the congestion control while reducing the load to the computer.

Furthermore, even if a transmission packet or an acknowledgment packet is lost during transmission, freezing of data transmission process can be prevented.

Moreover, it is possible to shift quickly to the optimal transmission rate from the time at which the packet is started to be transmitted or from the time at which the packet is lost.

Furthermore, instead of the response time obtained from the transmission time information, the result of the averaging process is used for the process of within-threshold determination. The averaging process is performed so that it is more heavily weighted toward the response time of the previous transmission packet which is transmitted before the transmission packet is transmitted, as compared with the response time of the transmission packet. Consequently, an abrupt change in the transmission rate of the packets can be minimized, thus preventing an unstable state of communications over the network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control system that includes a transmitting device that transmits a transmission packet to a receiving device, wherein the receiving device transmits an acknowledgement to a transmitting device upon receiving the transmission packet, wherein
   the receiving device includes
      a response processor that sends transmission time information included in the transmission packet to the transmitting device as the acknowledgment, and
   the transmitting device includes
      a within-threshold determining unit that determines whether a response time calculated based on the transmission time information received from the receiving device is shorter than a threshold, and
      a transmission controller that controls, when the response time is shorter than the threshold, so as to transmit to the receiving device either one of a larger number of packets than the number of packets upon transmission of the transmission packet and the same number of packets as the number of packets upon transmission of the transmission packet, wherein
   the within-threshold determining unit uses a result of an averaging process for a process of within-threshold determination, instead of the response time obtained from the transmission time information sent-back by the response processor, the averaging process being performed so that it is more heavily weighted toward a response time of a previous transmission packet which is transmitted before the transmission packet is transmitted, as compared with the response time of the transmission packet.

2. The communication control system according to claim 1, wherein when the response processor does not receive an acknowledgment within a specified time, the transmission controller controls so as to transmit a packet without waiting for receiving an acknowledgment.

3. The communication control system according to claim 1, wherein when an acknowledgment is not received from the receiving device within a specified time or when a start packet is to be transmitted to the receiving device, the transmission controller controls so as to transmit a plurality of packets to the receiving device.

4. The communication control system according to claim 1, wherein
the transmitting device further includes
a packet loss detector that detects whether a transmission packet is lost based on the acknowledgment received from the response processor, and
the transmission controller controls, when it is detected that the transmission packet is lost, so as to transmit a smaller number of packets than the number of packets upon transmission of a single packet or of the transmission packet, to the receiving device, even if it is determined that the response time is shorter than the threshold.

5. The communication control system according to claim 1, wherein the response processor sends the acknowledgment at a frequency.

6. A method of controlling packet communications between a transmitting device and a receiving device, wherein the transmitting device transmits a packet to the receiving device and the receiving device transmits an acknowledgement to the transmitting device upon receiving the transmission packet, the method comprising:
the receiving device sending transmission time information included in the transmission packet to the transmitting device as the acknowledgment, and
the transmitting device
determining whether a response time calculated based on the transmission time information received from the receiving device is shorter than a threshold, and
transmitting to the receiving device, when the response time is shorter than the threshold, either one of a larger number of packets than the number of packets upon transmission of the transmission packet and the same number of packets as the number of packets upon transmission of the transmission packet, wherein
the determining includes using a result of an averaging process for a process of within-threshold determination, instead of the response time obtained from the transmission time information sent-back by the response processor, the averaging process being performed so that it is more heavily weighted toward a response time of a previous transmission packet which is transmitted before the transmission packet is transmitted, as compared with the response time of the transmission packet.

7. The method according to claim 6, wherein when an acknowledgment is not received from the receiving device within a specified time, the transmitting performed by the transmission controller includes transmitting a packet without waiting for receiving an acknowledgment.

8. The method according to claim 6, wherein when an acknowledgment is not received from the receiving device within a specified time or when a start packet is to be transmitted to the receiving device, the transmitting performed by the transmission controller includes transmitting a plurality of packets to the receiving device.

9. The method according to claim 6, wherein the transmitting device further performs detecting whether a transmission packet is lost based on the acknowledgment, and
the transmitting includes transmitting to the receiving device, when it is detected that the transmission packet is lost, a smaller number of packets than the number of packets upon transmission of a single packet or of the transmission packet, even if it is determined that the response time is shorter than the threshold.

10. The method according to claim 6, wherein the sending performed by the receiving unit sending the acknowledgment at a specified frequency.

* * * * *